United States Patent
Yu et al.

(10) Patent No.: US 11,252,304 B2
(45) Date of Patent: Feb. 15, 2022

(54) SKIN COLOR IMAGE GAMUT WEIGHT DETECTING METHOD AND DEVICE THEREOF

(71) Applicant: REALTEK SEMICONDUCTOR CORP., Hsinchu (TW)

(72) Inventors: Teng-Hsiang Yu, Hsinchu (TW); Hiroaki Endo, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 273 days.

(21) Appl. No.: 16/725,359

(22) Filed: Dec. 23, 2019

(65) Prior Publication Data

US 2020/0404124 A1    Dec. 24, 2020

(30) Foreign Application Priority Data

Jun. 24, 2019 (TW) ................. 108122026

(51) Int. Cl.
    *H04N 1/60*     (2006.01)
    *H04N 1/62*     (2006.01)

(52) U.S. Cl.
    CPC .......... *H04N 1/6066* (2013.01); *H04N 1/628* (2013.01); *G06T 2207/10024* (2013.01); *G06T 2207/30088* (2013.01)

(58) Field of Classification Search
    CPC ................. H04N 1/6066; H04N 1/628; G06T 2207/10024; G06T 2207/30088
    See application file for complete search history.

(56) References Cited

U.S. PATENT DOCUMENTS

| 2012/0154633 | A1 | 6/2012 | Rodriguez |
| 2013/0216131 | A1 | 8/2013 | Free |
| 2015/0086119 | A1* | 3/2015 | Sato ................... G06K 9/00234 382/195 |

FOREIGN PATENT DOCUMENTS

| CN | 104469138 A | 3/2015 |
| CN | 107595387 A | 1/2018 |
| TW | 200424526 A | 11/2004 |

\* cited by examiner

*Primary Examiner* — Christopher Wait
(74) *Attorney, Agent, or Firm* — Birch, Stewart, Kolasch & Birch, LLP

(57) ABSTRACT

A skin color image gamut weight detecting method and a device thereof are provided. The method includes: receiving an image including first color components and second color components; obtaining a skin color region, a skin color category, and a first gamut; obtaining first color component values and first cardinal numbers according to the first color components; obtaining second color component values and a plurality of second cardinal numbers according to the second color components; obtaining a second gamut and a weight center according to the skin color category, the first cardinal numbers, the second cardinal numbers, the first color component values, and the second color component values; obtaining a first weight area and a second weight area according to the first gamut and the second gamut; and obtaining a skin color gamut weight map according to the weight center, the first weight area, and the second weight area.

10 Claims, 14 Drawing Sheets

```
┌─────────┐    ┌──────────────────────────────────────────────┐
│         │    │ Obtain a plurality of first calibration cardinal numbers, a │
│         │    │ plurality of first calibration color component values, a plurality │
│ S151B   ├────┤ of second calibration cardinal numbers, and a plurality of │
│         │    │ second calibration color component values according to the │
│         │    │ skin color category, the first cardinal numbers, the first color │
│         │    │ component values, the second cardinal numbers, and the │
│         │    │ second color component values │
└─────────┘    └──────────────────────────────────────────────┘
```

- S151B: Obtain a plurality of first calibration cardinal numbers, a plurality of first calibration color component values, a plurality of second calibration cardinal numbers, and a plurality of second calibration color component values according to the skin color category, the first cardinal numbers, the first color component values, the second cardinal numbers, and the second color component values

- S152B: Obtain the weight center according to the first calibration color component value corresponding to a first maximum value in the first calibration cardinal numbers and the second calibration color component value corresponding to a second maximum value in the second calibration cardinal numbers

- S153B: Obtain a first threshold according to the first maximum value in the first calibration cardinal numbers and a first coefficient

- S154B: Obtain a second threshold according to the second maximum value in the second calibration cardinal numbers and a second coefficient

- S155B: Set the first calibration cardinal numbers greater than or equal to the first threshold as a plurality of first selected cardinal numbers

- S156B: Set the second calibration cardinal numbers greater than or equal to the second threshold as a plurality of second selected cardinal numbers

- S157B: Obtain the second gamut according to the first selected cardinal numbers, the first calibration color component values, the second selected cardinal numbers, and the second calibration color component values

FIG. 9

SKIN COLOR IMAGE GAMUT WEIGHT DETECTING METHOD AND DEVICE THEREOF

CROSS-REFERENCE TO RELATED APPLICATION

This non-provisional application claims priority under 35 U.S.C. § 119(a) to Patent Application No. 108122026 in Taiwan, R.O.C. on Jun. 24, 2019, the entire contents of which are hereby incorporated by reference.

BACKGROUND

Technical Field

This solution relates to the image processing field, and in particular, to a skin color image gamut weight detecting method and a device thereof.

Related Art

At present, most users have requirements for functions of retouching, and the users adjust shapes, chroma, and brightness of images according to preferences. In particular, most attention is paid to functions of adjusting a skin color of a character.

However, in the prior art, when an image is retouched, color correction is performed on all pixels in the image, so that when colors of a background or clothes of character are adjusted, a skin color of a character that is the same as adjusted colors is inevitably adjusted. In the prior art, even if the adjusted skin color of the character meets user expectations, the background often fails to meet expectations, for example, the background is excessively dark, the background is excessively bright, or chroma of the background is distorted. On the contrary, when the background is normal, the skin color of the character is not adjusted to chroma or brightness expected by users. The reason for the two undesirable situations is that users expect a changed skin color, such as partial white or partial bronze, instead of an original skin color at present. However, users also expect that the background is normal. Therefore, when there is no partial color deviation or overexposure in a whole image (including a character and a background), in the prior art, the whole image cannot be retouched to achieve an effect expected by users. As a result, there are still disadvantages in the prior art in adjusting a skin color of a character in an image.

SUMMARY

In view of this, this solution provides a skin color image gamut weight detecting method and a device thereof.

According to some embodiments, a skin color image gamut weight detecting method includes: receiving an image, the image having a character image, the image including a plurality of pixels, and each of the pixels including a first color component and a second color component; obtaining a skin color region of the character image, a skin color category corresponding to the skin color region, and a first gamut corresponding to the skin color category according to a skin color determining program; obtaining a plurality of first color component values and a plurality of first cardinal numbers according to the first color components in the skin color region; obtaining a plurality of second color component values and a plurality of second cardinal numbers according to the second color components in the skin color region; obtaining a second gamut and a weight center according to the skin color category, the first cardinal numbers, the first color component values, the second cardinal numbers, and the second color component values; obtaining a first weight area and a second weight area according to the first gamut and the second gamut; and obtaining a skin color gamut weight map corresponding to the skin color region according to the weight center, the first weight area, and the second weight area.

According to some embodiments, a skin color image gamut weight detecting device includes: an image receiving circuit, a skin color determining circuit, a skin color analyzing circuit, a gamut obtaining circuit, and a skin color gamut weight map obtaining circuit. The image receiving circuit is configured to receive an image, the image having a character image, the image including a plurality of pixels, and each of the pixels including a first color component and a second color component. The skin color determining circuit is configured to obtain a skin color region of the character image, a skin color category corresponding to the skin color region, and a first gamut corresponding to the skin color category according to a skin color determining program. The skin color analyzing circuit is configured to obtain a plurality of first color component values and a plurality of first cardinal numbers according to the first color components in the skin color region. In addition, the skin color analyzing circuit is configured to obtain a plurality of second color component values and a plurality of second cardinal numbers according to the second color components in the skin color region. The gamut obtaining circuit is configured to obtain a second gamut and a weight center according to the skin color category, the first cardinal numbers, the first color component values, the second cardinal numbers, and the second color component values. In addition, the skin color gamut weight map obtaining circuit is configured to obtain a first weight area and a second weight area according to the first gamut and the second gamut. In addition, the skin color gamut weight map obtaining circuit is configured to obtain a skin color gamut weight map corresponding to the skin color region according to the weight center, the first weight area, and the second weight area.

In conclusion, the skin color image gamut weight detecting method and the device thereof provided in some embodiments of this solution can obtain the skin color gamut weight map of the skin color region of the character image according to the image having the character image.

BRIEF DESCRIPTION OF THE DRAWINGS

FIG. 9 is a flowchart of a gamut obtaining program (2) according to some embodiments of this solution;

DETAILED DESCRIPTION

Figure 1:
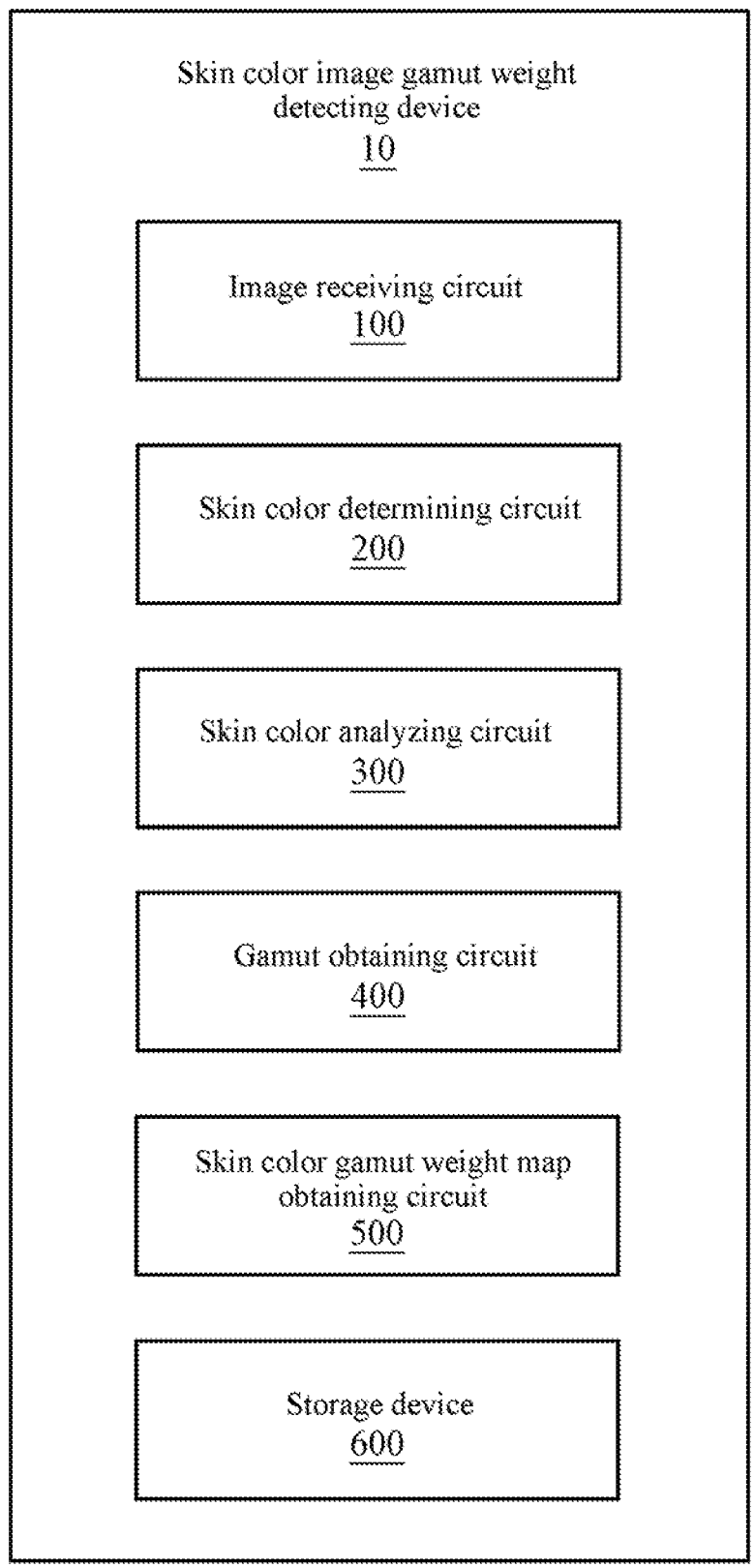
FIG. 1 is a schematic diagram of a skin color image gamut weight detecting device according to some embodiments of this solution.

FIG. 1 is a schematic diagram of a skin color image gamut weight detecting device 10 according to some embodiments of this solution. Referring to FIG. 1, in some embodiments, the skin color image gamut weight detecting device 10 includes: an image receiving circuit 100, a skin color determining circuit 200, a skin color analyzing circuit 300, a gamut obtaining circuit 400, and a skin color gamut weight map obtaining circuit 500. Any two of the image receiving circuit 100, the skin color determining circuit 200, the skin color analyzing circuit 300, the gamut obtaining circuit 400, and the skin color gamut weight map obtaining circuit 500 are coupled to each other. For example, the image receiving circuit 100, the skin color determining circuit 200, the skin color analyzing circuit 300, the gamut obtaining circuit 400, and the skin color gamut weight map obtaining circuit 500 may be implemented by using individual chips or integrated on a single chip but are not limited thereto. This solution is not limited thereto.

In some embodiments, the skin color image gamut weight detecting device 10 further includes a storage device 600. The storage device 600 is coupled to the image receiving circuit 100, the skin color determining circuit 200, the skin color analyzing circuit 300, the gamut obtaining circuit 400, and the skin color gamut weight map obtaining circuit 500. Data that is input or output between the image receiving circuit 100, the skin color determining circuit 200, the skin color analyzing circuit 300, the gamut obtaining circuit 400, and the skin color gamut weight map obtaining circuit 500 is not limited to being accessed by the storage device 600 or directly accessed through a storage function built in each circuit. The storage device 600 may be but is not limited to a volatile memory, a read-only memory, a flash memory, or a disk.

Figure 2:
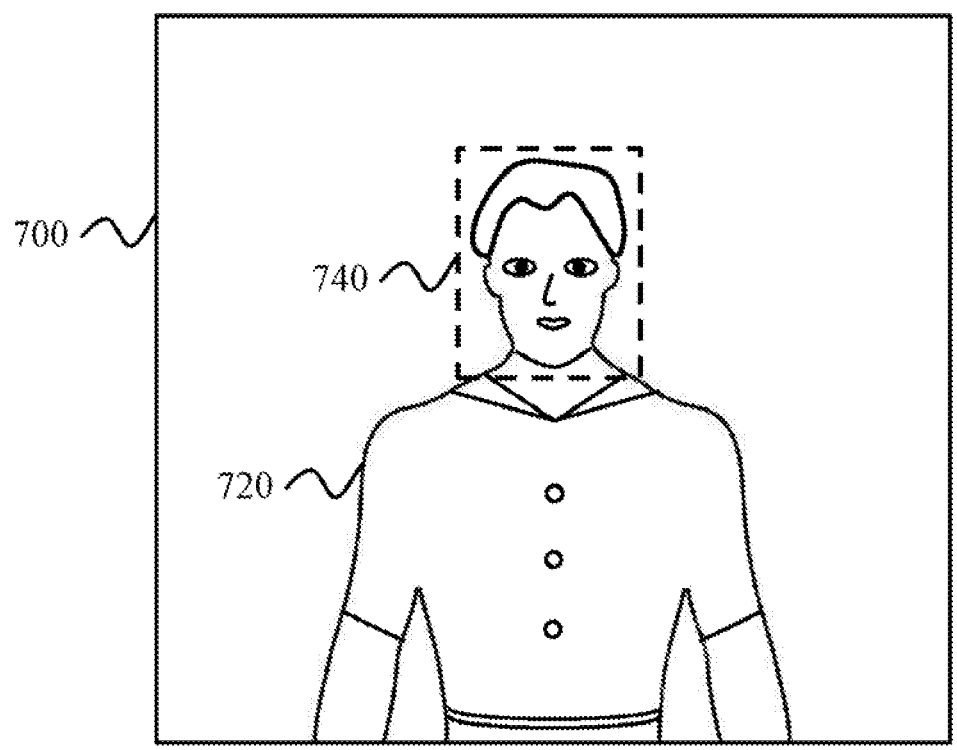
FIG. 2 is a schematic diagram of a character image according to some embodiments of this solution.

FIG. 2 is a schematic diagram of a character image 720 according to some embodiments of this solution. Referring to FIG. 1 and FIG. 2, in some embodiments, the image receiving circuit 100 is configured to receive an image 700 from the outside. The image 700 has a character image 720, and the character image 720 has a skin color region 740. Specifically, the image 700 includes a plurality of pixels, and each of the pixels includes a first color component U and a second color component V. According to some embodiments, the pixels are arranged in a two-dimensional array according to a first axial direction and a second axial direction. The first color component U represents a "U color component" in a luminance, chrominance, and chroma (YUV) color model, and the second color component V represents a "V color component" in the YUV color model. That is, the first color component U and the second color component V are used to represent chrominance and chroma of the pixels, and "color components" are used as a general name of "the first color component U and the second color component V". It should be particularly noted that for ease of description, in this specification, an example in which the image 700 has only one character image 720 and the character image 720 has only one skin color region 740 is used. In practice, the image 700 may have one or more character images 720, and the character image 720 may also have one or more skin color regions 740.

In some embodiments, the first color component U and the second color component V are respectively color components in the YUV color model, such as a "Y color component", a "U color component", a "V color component", or a combination thereof. In some embodiments, the first color component U and the second color component V are respectively color components in a hue, saturation, and lightness (HSV) color model, such as an "H color component", an "S color component", an "L color component", or a combination thereof. It should be particularly noted that this solution is not limited to being applied to color components in the YUV color model, the HSV color model, or other color models.

Figure 3:
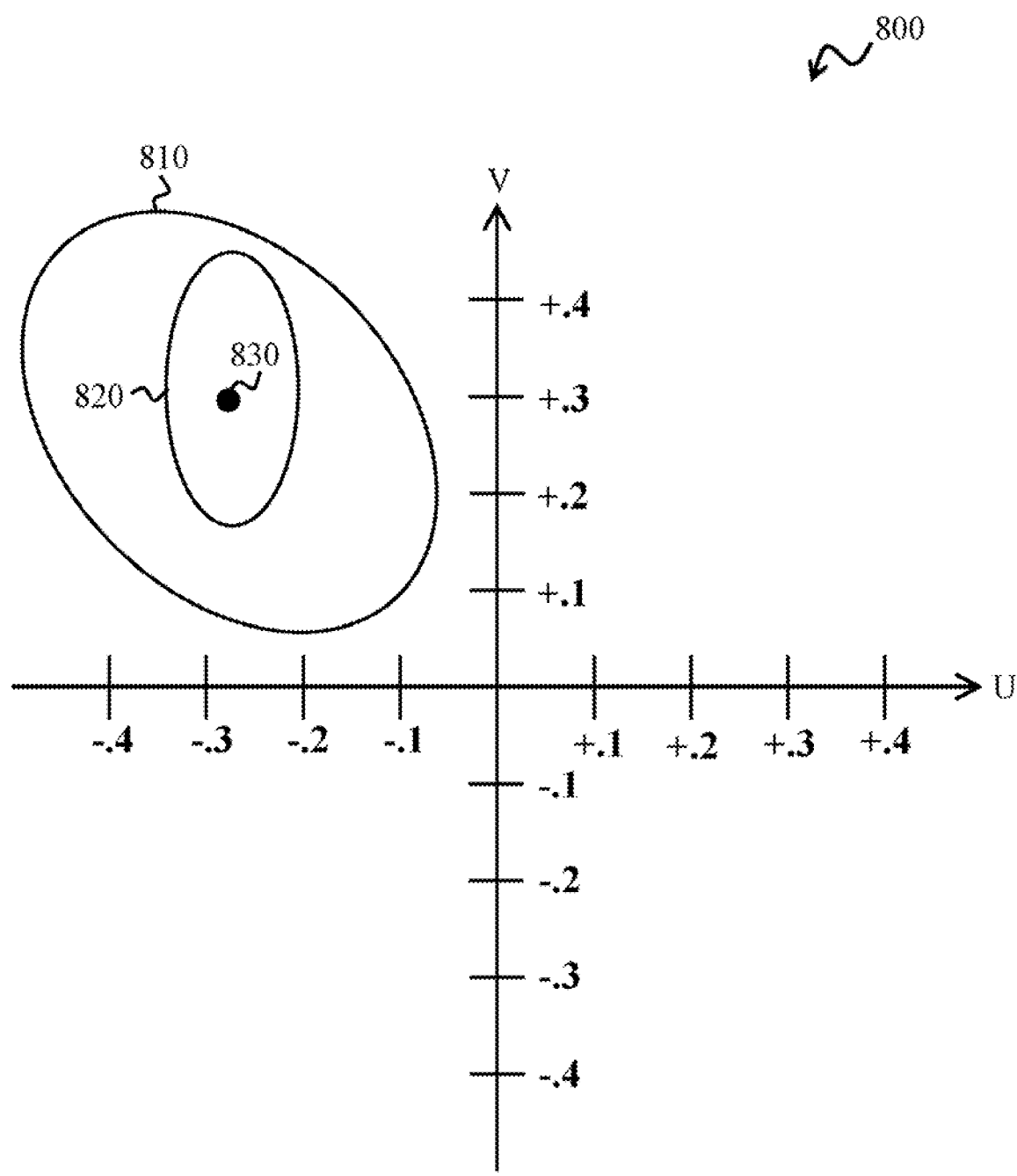
FIG. 3 is a schematic diagram of a skin color region according to some embodiments of this solution.

FIG. 3 is a schematic diagram of a skin color region 740 according to some embodiments of this solution. Referring to FIG. 1 to FIG. 3, in some embodiments, the skin color image gamut weight detecting device 10 is configured to receive the image 700, and output a skin color gamut weight map corresponding to the skin color region 740. The skin color gamut weight map includes color components related to a skin color of the character image 720 and weight values corresponding to the color components. It should be particularly noted that the weight values are used to represent importance of the color components to the skin color region 740 (for example, a proportion of the color components in the skin color region 740). First, the image 700 is received by the image receiving circuit 100. Then the skin color image gamut weight detecting device 10 obtains gamut of the skin color region 740 of the character image 720 of the image 700 in two manners, for example, a first gamut 810 and a second gamut 820 in a UV color plane 800.

In some embodiments, the first gamut 810 and the second gamut 820 are distributed in the UV color plane 800. Specifically, in the YUV color model, the first gamut 810 and the second gamut 820 are sets of some of color components in the UV color plane 800. According to some embodiments, that the first gamut 810 includes the second gamut 820 represents that a set of color components represented by the first gamut 810 covers and is greater than a set of color components represented by the second gamut 820. It should be particularly noted that, in FIG. 3, an X-axis represents a normalized first color component U, and a Y-axis represents a normalized second color component V. For example, an original range of values of a U color component and a V color component is 127 to −128, and a range of values of a U color component and a V color component after normalization is +1 to −1. FIG. 3 only shows a part from +0.5 to −0.5.

Second, in some embodiments, the first gamut 810 is obtained by the skin color determining circuit 200, and the second gamut 820 is obtained by the skin color analyzing circuit 300 and the gamut obtaining circuit 400. The skin color determining circuit 200 obtains the first gamut 810 according to the skin color region 740 of the character image 720. Specifically, the skin color determining circuit 200 classifies distribution of color components in the skin color region 740 according to the skin color category, to obtain the skin color category corresponding to the skin color region 740, and each of the skin color categories (such as a skin color of the yellow race, a skin color of the black race, a skin color of the white race, a skin color of the Middle East race, and skin colors of various races; this solution is not limited thereto) has a corresponding gamut, where the first gamut 810 is a gamut corresponding to the skin color category of the first gamut 810.

The skin color analyzing circuit 300 and the gamut obtaining circuit 400 obtain the second gamut 820 according to the skin color region 740 of the character image 720. Specifically, the skin color analyzing circuit 300 counts distribution of the color components in the skin color region 740, to obtain corresponding quantities of the color component values. The gamut obtaining circuit 400 obtains the second gamut 820 and a weight center 830 according to the corresponding quantities of the color component values and by selecting color component values whose quantity meets a specific threshold. According to some embodiments, the gamut obtaining circuit 400 obtains the weight center 830 by using a maximum quantity of color component values.

Finally, the skin color gamut weight map obtaining circuit 500 is configured to receive the first gamut 810, the second gamut 820, and the weight center 830. The skin color gamut weight map obtaining circuit 500 obtains a skin color gamut weight map corresponding to the skin color region 740 according to the first gamut 810, the second gamut 820, and the weight center 830.

Figure 4:
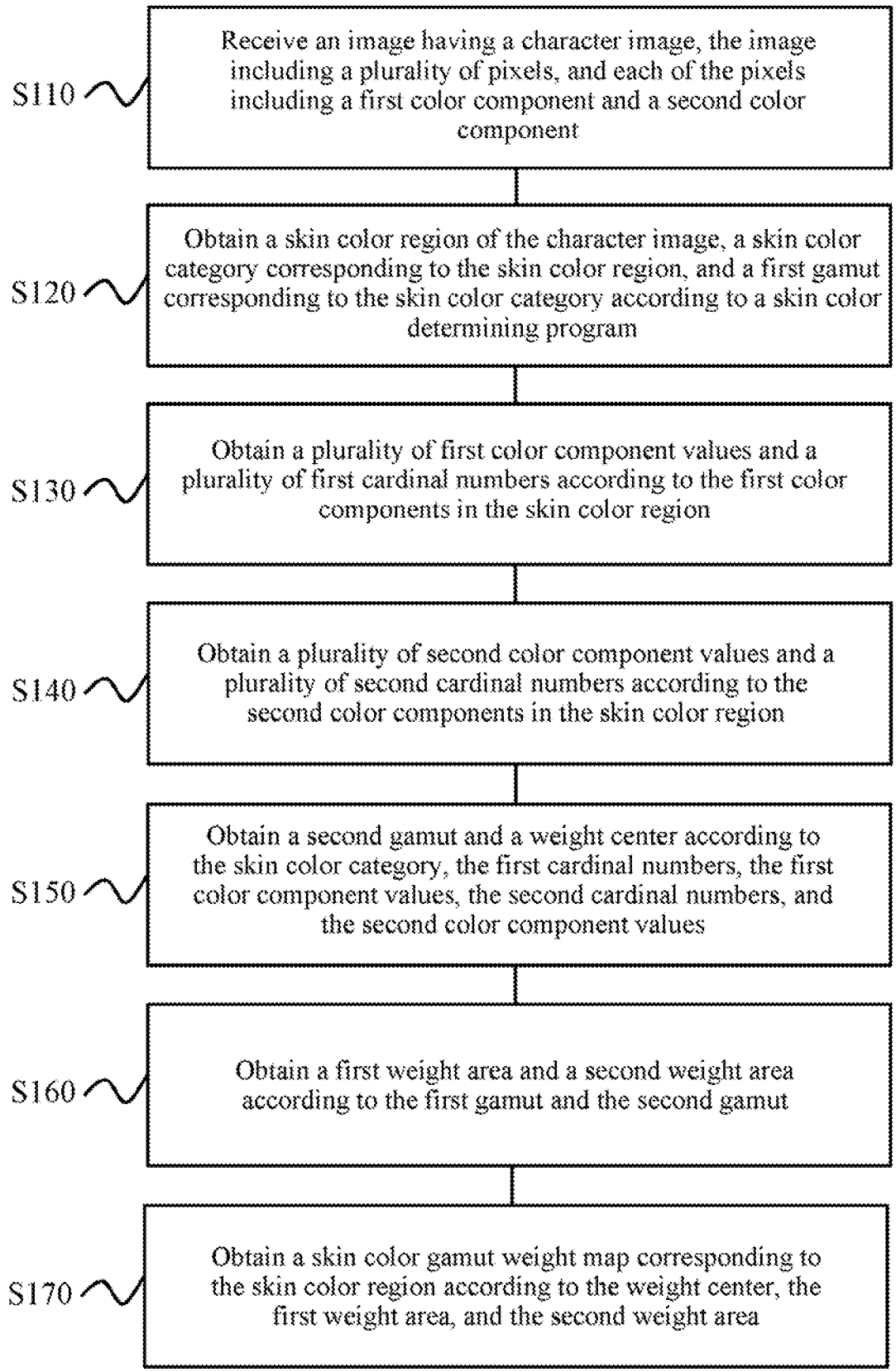
FIG. 4 is a flowchart of a skin color image gamut weight detecting method according to some embodiments of this solution.

FIG. 4 is a flowchart of a skin color image gamut weight detecting method according to some embodiments of this solution. Referring to FIG. 4, in some embodiments, the skin color image gamut weight detecting method includes the following steps: receiving an image 700 having a character image 720, the image 700 including a plurality of pixels, and each of the pixels including a first color component U and a second color component V (step S110); obtaining a skin color region 740 of the character image 720, a skin color category corresponding to the skin color region 740, and a first gamut 810 corresponding to the skin color category according to a skin color determining program (step S120); obtaining a plurality of first color component values and a plurality of first cardinal numbers N1 according to the first color components U in the skin color region 740 (step S130); obtaining a plurality of second color component values and a plurality of second cardinal numbers N2 according to the second color components V in the skin color region 740 (step S140); obtaining a second gamut 820 and a weight center 830 according to the skin color category, the first cardinal numbers N1, the first color component values, the second cardinal numbers N2, and the second color component values (step S150); obtaining a first weight area 840 and a second weight area 850 according to the first gamut 810 and the second gamut 820 (step S160); and obtaining a skin color gamut weight map corresponding to the skin color region 740 according to the weight center 830, the first weight area 840, and the second weight area 850 (step S170).

Referring to both FIG. 1 and FIG. 4, in step S110, in some embodiments, the image 700 is received by the image receiving circuit 100, and the image receiving circuit 100 outputs the image 700 for the skin color determining circuit 200, the skin color analyzing circuit 300, the gamut obtaining circuit 400, and the skin color gamut weight map obtaining circuit 500 to receive and use.

Continue to refer to FIG. 1 and FIG. 4. In step S120, in some embodiments, the skin color determining circuit 200 first obtains the skin color region 740 of the character image 720 by using the image 700 according to the skin color determining program, then for the skin color region 740, the skin color category corresponding to the skin color region 740 is obtained, and later, the first gamut 810 corresponding to the skin color category is obtained according to the skin color category. In some embodiments, the image 700 has one character image 720, and the character image 720 has one skin color region 740. The skin color region 740 represents parts of the character image 720 with bare skin, such as a face, a neck, an arm, or other parts with bare skin. A shape of the skin color region 740 is not limited to a shape of the character image 720, such as an irregular profile, a square, an oval or other shapes, that is, the skin color region 740 may include parts with bare skin and region around the parts with bare skin. For example, the skin color region 740 shown in FIG. 2 is a square, parts with bare skin are a face and a neck, and hair and a background around the bare skin are also a part of the skin color region 740.

Figure 5:
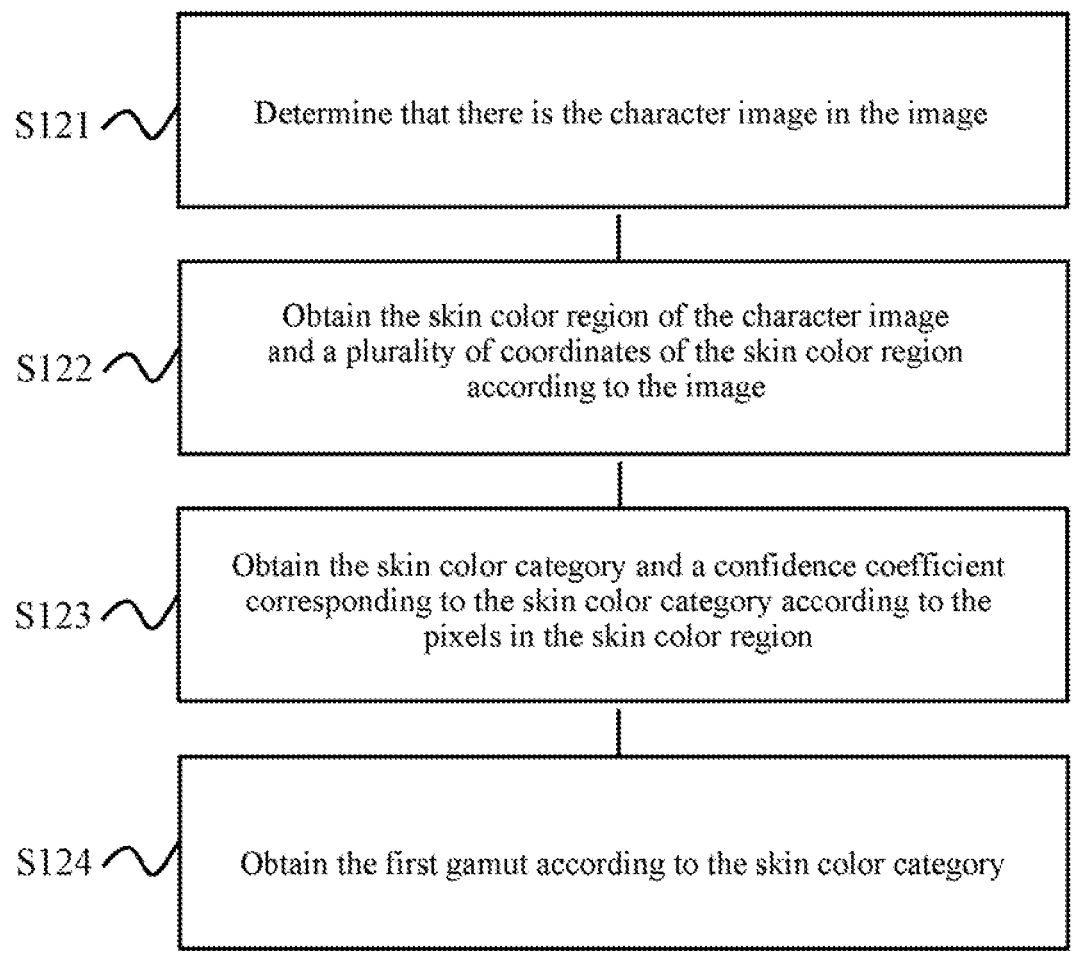
FIG. 5 is a flowchart of a skin color determining program according to some embodiments of this solution.

FIG. 5 is a flowchart of a skin color determining program according to some embodiments of this solution. Referring to FIG. 5, in some embodiments, the skin color determining program includes the following steps: determining that there is the character image 720 in the image 700 (step S21); obtaining the skin color region of the character image 720 and a plurality of coordinates of the skin color region according to the image 700 (step S122); obtaining the skin color category and a confidence coefficient corresponding to the skin color category according to the pixels in the skin color region (step S123); and obtaining the first gamut 810 according to the skin color category (step S124).

Referring to FIG. 2 and FIG. 5, in step S121, in some embodiments, the skin color determining circuit 200 performs step S122 to step S124 after determining that there is the character image 720 in the image 700. On the contrary, if the skin color determining circuit 200 determines that there is no character image 720 in the image 700, the skin color determining circuit 200 stops the skin color determining program.

Referring to FIG. 2 and FIG. 5, in step S122, in some embodiments, the skin color determining circuit 200 obtains the skin color region 740 of the character image 720 and the plurality of coordinates of the skin color region 740 according to the image 700. In practice, according to some embodiments, the skin color determining circuit 200 can locate the skin color region 740 and coordinates of the skin color region by determining facial features and contours of faces.

In step S123, in some embodiments, the skin color determining circuit 200 obtains the skin color category and a confidence coefficient corresponding to the skin color category according to the skin color region 740. Specifically, the confidence coefficient is used to represent degree of reliability of the skin color determining circuit 200 in determining the skin color category of the skin color region 740. The confidence coefficient may range from 0% to 100%, and as the confidence coefficient is closer to 100%, the skin color category determined by the skin color determining circuit 200 is more likely to be correct. On the contrary, as the confidence coefficient is closer to 0%, the skin color category determined by the skin color determining circuit 200 is more likely to be wrong. In step S124, in some embodiments, the skin color determining circuit 200 obtains the first gamut 810 according to the skin color category.

Figure 6:
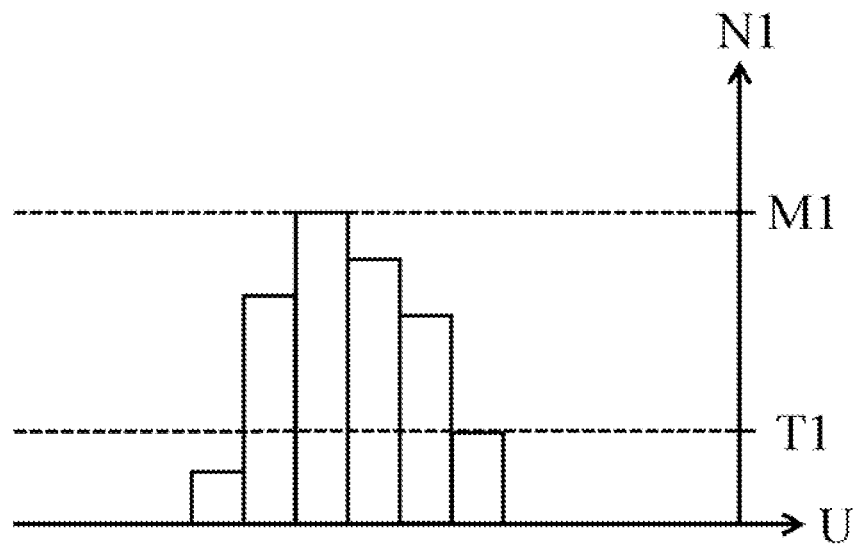
FIG. 6 is a schematic diagram of a first histogram according to some embodiments of this solution.
Figure 7:
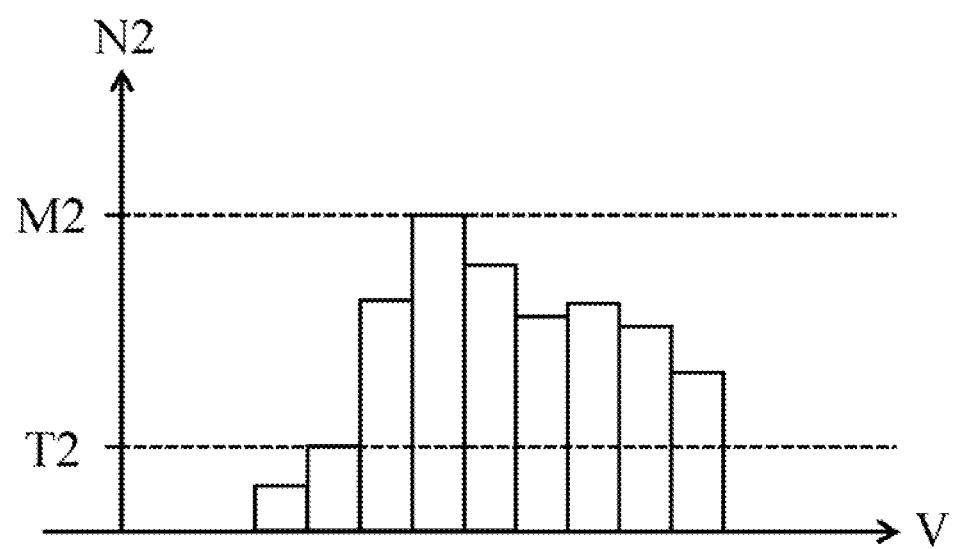
FIG. 7 is a schematic diagram of a second histogram according to some embodiments of this solution.

FIG. 6 is a schematic diagram of a first histogram according to some embodiments of this solution, and FIG. 7 is a schematic diagram of a second histogram according to some embodiments of this solution. Referring to all of FIG. 4, FIG. 6, and FIG. 7, in step S130 and step S140, in some embodiments, the skin color analyzing circuit 300 is configured to obtain a plurality of first color component values and a plurality of first cardinal numbers N1 according to the first color components U in the skin color region 740 (as shown in FIG. 6). The skin color analyzing circuit 300 is also configured to obtain a plurality of second color component values and a plurality of second cardinal numbers N2 according to the second color components V in the skin color region 740 (as shown in FIG. 7). Specifically, the first cardinal numbers N1 are a corresponding quantity of the first color component values, and the second cardinal numbers N2 are a corresponding quantity of the second color component values. Because the skin color region 740 includes a plurality of first color components U and a plurality of second color components V, the skin color analyzing circuit 300 obtains the plurality of first color component values and the plurality of first cardinal numbers N1 by counting the first color components U in the skin color region 740. The first color component values and the first cardinal numbers N1 are shown in a histogram, namely, the first histogram (as shown in FIG. 6). The skin color analyzing circuit 300 obtains the plurality of second color component values and the plurality of second cardinal numbers N2 by counting the second color components V in the skin color region 740. The second color component values and the second cardinal numbers N2 are shown in a histogram, namely, the second histogram (as shown in FIG. 7). In FIG. 6, an X-axis represents the first color component U, and a Y-axis represents the corresponding quantity of the first color component values, namely, the first cardinal numbers N. In FIG. 7, an X-axis represents the second color component V, and a Y-axis represents the corresponding quantity of the second color component values, namely, the second cardinal numbers N2.

Continue to refer to FIG. 4, FIG. 6, and FIG. 7. In S150, in some embodiments, the gamut obtaining circuit 400 is configured to obtain a second gamut 820 and a weight center 830 according to the skin color category, the first cardinal numbers N1, the first color component values, the second cardinal numbers N2, and the second color component values. Specifically, in some embodiments, because some of the first color component values and some of the second color component values do not belong to the race corresponding to the skin color category, the gamut obtaining circuit 400 needs to first eliminate those first color component values and those second color component values. For example, a skin color range of the Asian do not include a pixel with the first color component U being 0 (U=0) and the second color component V being 0 (V=0) (namely, a gray-scale pixel), so that the gamut obtaining circuit 400 eliminates values with the first color component U being 0 and the second color component V being 0, the corresponding first cardinal numbers N1, and the corresponding second cardinal numbers N2. Alternatively, in some embodiments, the gamut obtaining circuit 400 may also eliminate, according to the color components in the first gamut 810, some of the first color component values and some of the second color component values that do not belong to the first gamut 810. Then the gamut obtaining circuit 400 obtains the second gamut 820 and the weight center 830 according to the rest of the first cardinal numbers N1, the first color component values, the second cardinal numbers N2, and the second color component values.

Figure 8:
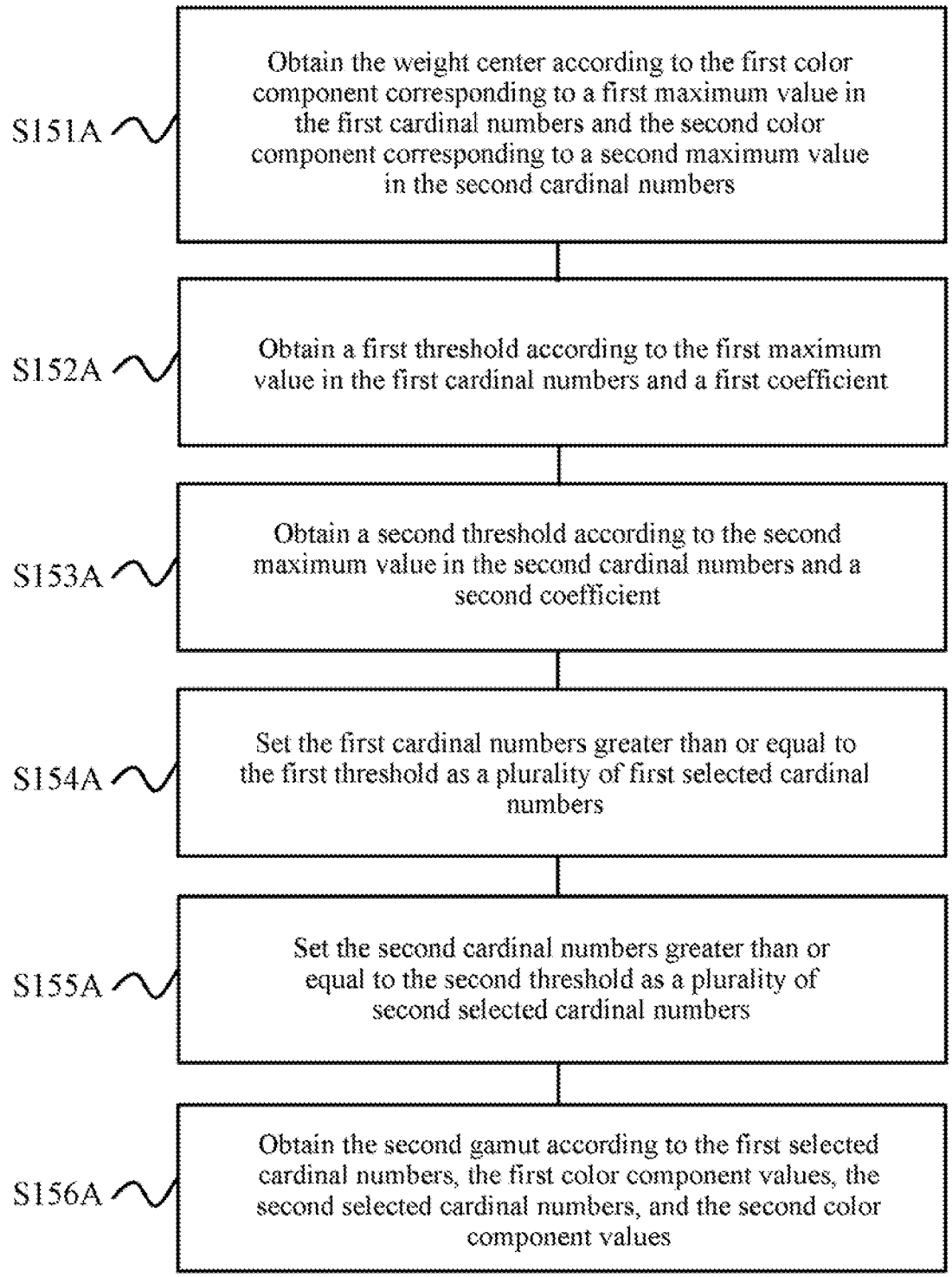
FIG. 8 is a flowchart of a gamut obtaining program (1) according to some embodiments of this solution.

FIG. 8 is a flowchart of a gamut obtaining program (1) according to some embodiments of this solution. Referring to both FIG. 6 to FIG. 8, in some embodiments, the gamut obtaining program is configured to obtain the second gamut 820 and the weight center 830, where the gamut obtaining program includes the following steps: obtaining the weight center 830 according to the first color component U corresponding to a first maximum value M1 in the first cardinal numbers N1 and the second color component V corresponding to a second maximum value M2 in the second cardinal numbers N2 (step S151A); obtaining a first threshold T1 according to the first maximum value M1 in the first cardinal numbers N1 and a first coefficient (step S152A); obtaining a second threshold T2 according to a second maximum value M2 in the second cardinal numbers N2 and a second coefficient (step S153A); setting the first cardinal numbers N1 greater than or equal to the first threshold T1 as a plurality of first selected cardinal numbers (step S154A); setting the second cardinal numbers N2 greater than or equal to the second threshold T2 as a plurality of second selected cardinal numbers (step S155A); and obtaining the second gamut 820 according to the first selected cardinal numbers, the first color component values, the second selected cardinal numbers, and the second color component values (step S56A).

Referring to FIG. 3 and FIG. 6 to FIG. 8, in step S151A, in some embodiments, the gamut obtaining circuit 400 obtains the weight center 830 according to the first color component value corresponding to a first maximum value M1 in the first cardinal numbers N1 and the second color component corresponding to a second maximum value M2 in the second cardinal numbers N2. Specifically, the first maximum value is a maximum value in the first cardinal numbers N1, and the second maximum value M2 is a maximum value in the second cardinal numbers N2. That is, the gamut obtaining circuit 400 uses a mode of the first color component values and a mode of the second color component values as the weight center 830.

Referring to FIG. 3 and FIG. 6 to FIG. 8, in step S152A and step S153A, in some embodiments, the gamut obtaining circuit 400 obtains a first threshold T1 according to the first maximum value M1 in the first cardinal numbers N1 and a first coefficient, and the gamut obtaining circuit 400 obtains a second threshold T2 according to a first maximum value M1 in the second cardinal numbers N2 and a second coefficient. Specifically, the gamut obtaining circuit 400 uses a product of the first maximum value M1 and the first coefficient as the first threshold T1, and uses a product of the second maximum value M2 and the second coefficient as the second threshold T2. For example, that the first coefficient is 60% represents that the first threshold T1 is 60% of the first maximum value M1, and that the second coefficient is 60% represents that the second threshold T2 is 60% of the second maximum value M2.

Referring to FIG. 3 and FIG. 6 to FIG. 8, in step S154A and step S155A, in some embodiments, the gamut obtaining circuit 400 selects the first cardinal numbers N1 greater than or equal to the first threshold T1 as the plurality of first selected cardinal numbers, and selects the second cardinal numbers N2 greater than or equal to the second threshold T2 as the plurality of second selected cardinal numbers. Specifically, only the first cardinal numbers N1 corresponding to the first color component values that are greater than or equal to the first threshold T1 can be selected as the first selected cardinal numbers, and only the second cardinal numbers N2 corresponding to the second color component values that are greater than or equal to the second threshold T2 can be selected as the second selected cardinal numbers.

Referring to FIG. 3 and FIG. 6 to FIG. 8, in step S156A, in some embodiments, the gamut obtaining circuit 400 obtains the second gamut 820 according to the first selected cardinal numbers, the first color component values, the second selected cardinal numbers, and the second color component values. Specifically, the gamut obtaining circuit 400 expresses the first selected cardinal numbers, the first color component values corresponding to the first selected cardinal numbers, the second selected cardinal numbers, and the second color component values corresponding to the second selected cardinal numbers in the UV color plane 800, to be the second gamut 820, where the first color component values corresponding to the first selected cardinal numbers and the second color component values corresponding to the second selected cardinal numbers are first normalized in the previous method.

FIG. 9 is a flowchart of a gamut obtaining program (2) according to some embodiments of this solution. Referring to all of FIG. 6. FIG. 7 and FIG. 9, in some embodiments, the gamut obtaining program is configured to obtain the second gamut 820 and the weight center 830, where the gamut obtaining program includes the following steps: obtaining a plurality of first calibration cardinal numbers, a plurality of first calibration color component values, a plurality of second calibration cardinal numbers, and a plurality of second calibration color component values according to the skin color category, the first cardinal numbers N1, the first color component values, the second cardinal numbers N2, and the second color component values (step S151B); obtaining the weight center 830 according to the first calibration color component value corresponding to a first maximum value M1 in the first calibration cardinal numbers and the second calibration color component value corresponding to a second maximum value M2 in the second calibration cardinal numbers (step S152B); obtaining a first threshold T1 according to the first maximum value M1 in the first calibration cardinal numbers and a first coefficient (step S153B); obtaining a second threshold T2 according to the second maximum value M2 in the second calibration cardinal numbers and a second coefficient (step S154B); setting the first calibration cardinal numbers greater than or equal to the first threshold T1 as the plurality of first selected cardinal numbers (step S155B); setting the second calibration cardinal numbers greater than or equal to the second threshold T2 as the plurality of second selected cardinal numbers (step S156B); and obtaining the second gamut 820 according to the first selected cardinal numbers, the first calibration color component values, the second selected cardinal numbers, and the second calibration color component values (step S157B).

In step S151B, in some embodiments, the gamut obtaining circuit 400 obtains a plurality of first calibration cardinal numbers, a plurality of first calibration color component values, a plurality of second calibration cardinal numbers, and a plurality of second calibration color component values according to the skin color category, the first cardinal numbers N1, the first color component values, the second cardinal numbers N2, and the second color component values. The gamut obtaining circuit 400 can determine, by using the skin color category, first color component values and second color component values that do not belong to the race corresponding to the skin color category. Therefore, the gamut obtaining circuit 400 eliminates the first color component values and the second color component values that do not belong to the skin color category from the first color component values and the second color component values, to obtain the first calibration color component values and the second calibration color component values. The first cardinal numbers N1 corresponding to the first calibration color component values are the first calibration cardinal numbers, and the second cardinal numbers N2 corresponding to the second calibration color component values are the second calibration cardinal numbers. Therefore, the gamut obtaining circuit 400 can further obtain the first calibration cardinal numbers and the second calibration cardinal numbers. The gamut obtaining program (2) is different from the gamut obtaining program (1) in that the first cardinal numbers N1, the first color component values, the second cardinal numbers N2, and the second color component values are first partially eliminated according to the skin color category by the gamut obtaining circuit 400, to obtain the first calibration cardinal numbers, the first calibration color component values, the second calibration cardinal numbers, and the second calibration color component values.

In step S152B, in some embodiments, the gamut obtaining circuit 400 obtains the weight center 830 according to the first calibration color component value corresponding to a first maximum value M1 in the first calibration cardinal numbers and the second calibration color component value corresponding to a second maximum value M2 in the second calibration cardinal numbers. Specifically, the first maximum value M1 is the maximum value in the first calibration cardinal numbers, and the second maximum value M2 is the maximum value in the second calibration cardinal numbers. That is, the gamut obtaining circuit 400 uses a mode of the first calibration color component values and a mode of the second calibration color component values as the weight center 830.

In step S153B and step S154B, in some embodiments, the gamut obtaining circuit 400 obtains a first threshold T1 according to the first maximum value M1 in the first calibration cardinal numbers and a first coefficient, and the gamut obtaining circuit 400 obtains a second threshold T2 according to the second maximum value M2 in the second calibration cardinal numbers and a second coefficient. Specifically, the gamut obtaining circuit 400 uses a product of the first maximum value M1 and the first coefficient as the first threshold T, and uses a product of the second maximum value M2 and the second coefficient as the second threshold T2. For example, that the first coefficient is 60% represents that the first threshold T1 is 60% of the first maximum value M1, and that the second coefficient is 60% represents that the second threshold T2 is 60% of the second maximum value M2.

In step S155B and step S156B, in some embodiments, the gamut obtaining circuit 400 selects the first calibration cardinal numbers greater than or equal to the first threshold T1 as the plurality of first selected cardinal numbers, and the gamut obtaining circuit 400 selects the second calibration cardinal numbers greater than or equal to the second threshold T2 as the plurality of second selected cardinal numbers. Specifically, only the first calibration cardinal numbers corresponding to the first calibration color component values that are greater than or equal to the first threshold T1 can be selected as the first selected cardinal numbers, and only the second calibration cardinal numbers corresponding to the second calibration color component values that are greater than or equal to the second threshold T2 can be selected as the second selected cardinal numbers.

In step S157B, in some embodiments, the gamut obtaining circuit 400 obtains the second gamut 820 according to the first selected cardinal numbers, the first calibration color component values, the second selected cardinal numbers, and the second calibration color component values. Specifically, the gamut obtaining circuit 400 expresses the first selected cardinal numbers, the first calibration color component values corresponding to the first selected cardinal numbers, the second selected cardinal numbers, and the second calibration color component values corresponding to the second selected cardinal numbers in the UV color plane 800, to be the second gamut 820, where the first calibration color component values corresponding to the first selected cardinal numbers and the second calibration color component values corresponding to the second selected cardinal numbers are first normalized in the previous method.

Figure 10:
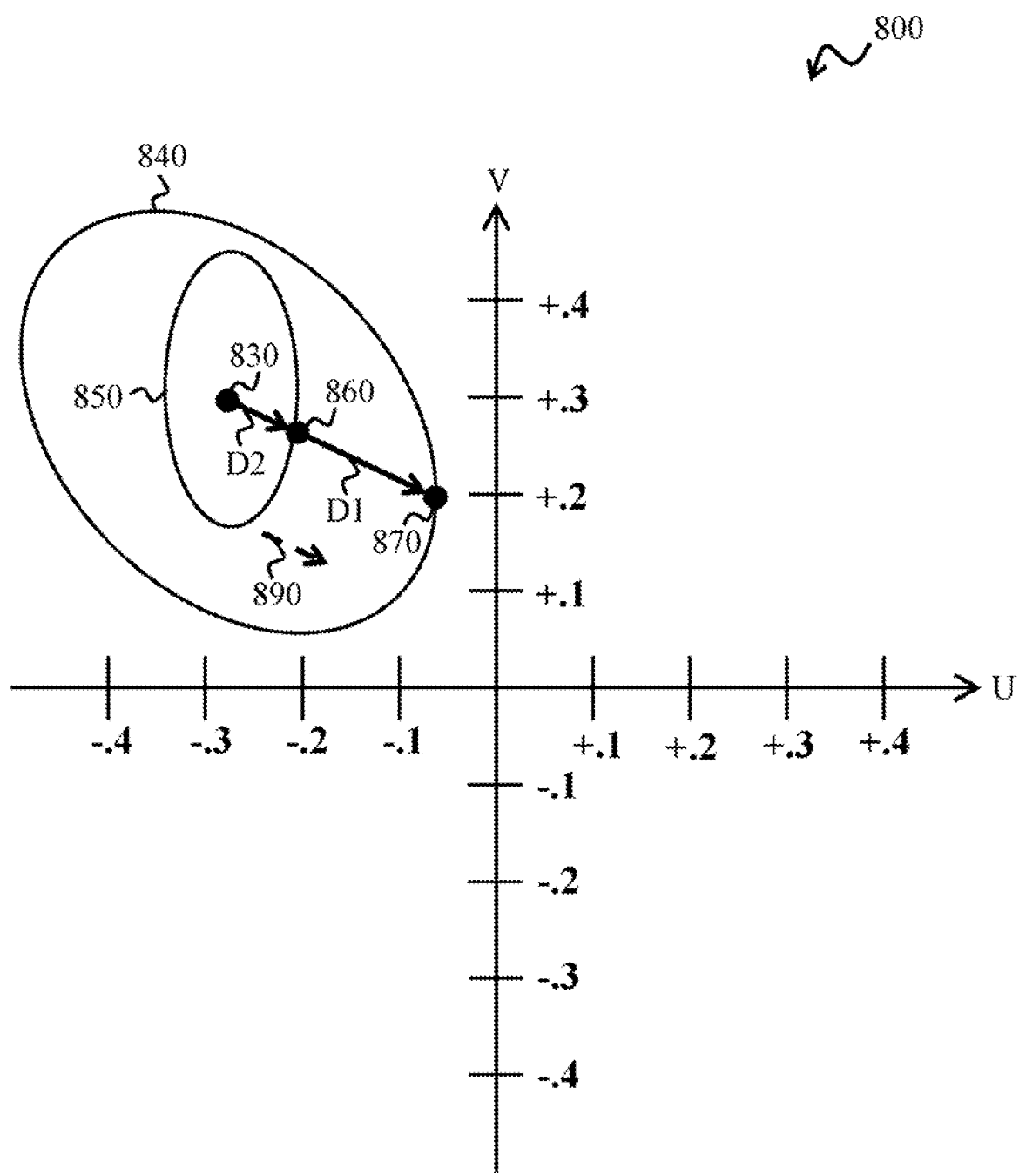
FIG. 10 is a schematic diagram of a weight area according to some embodiments of this solution.
Figure 12:
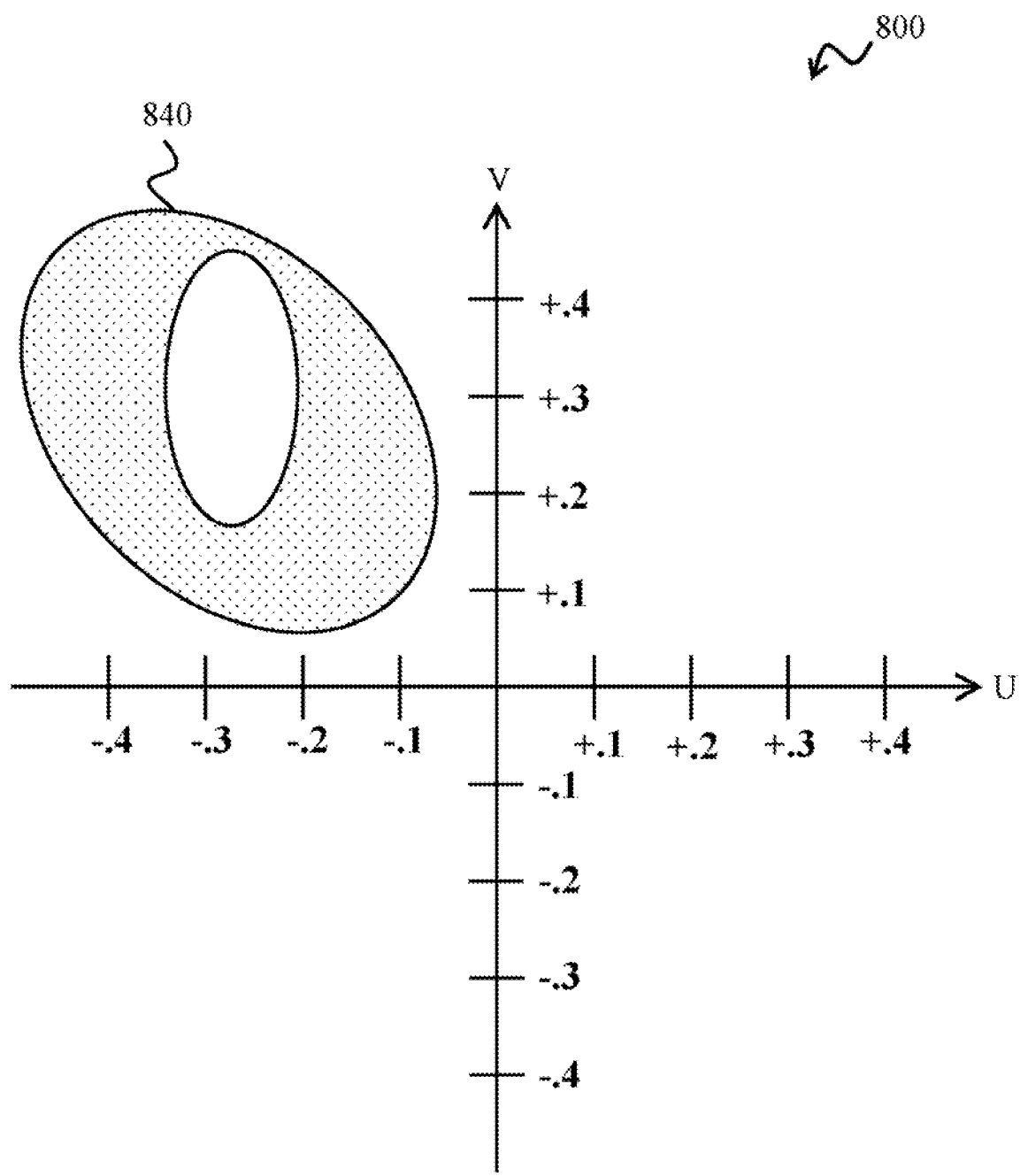
FIG. 12 is a schematic diagram of a first weight area according to some embodiments of this solution.
Figure 13:
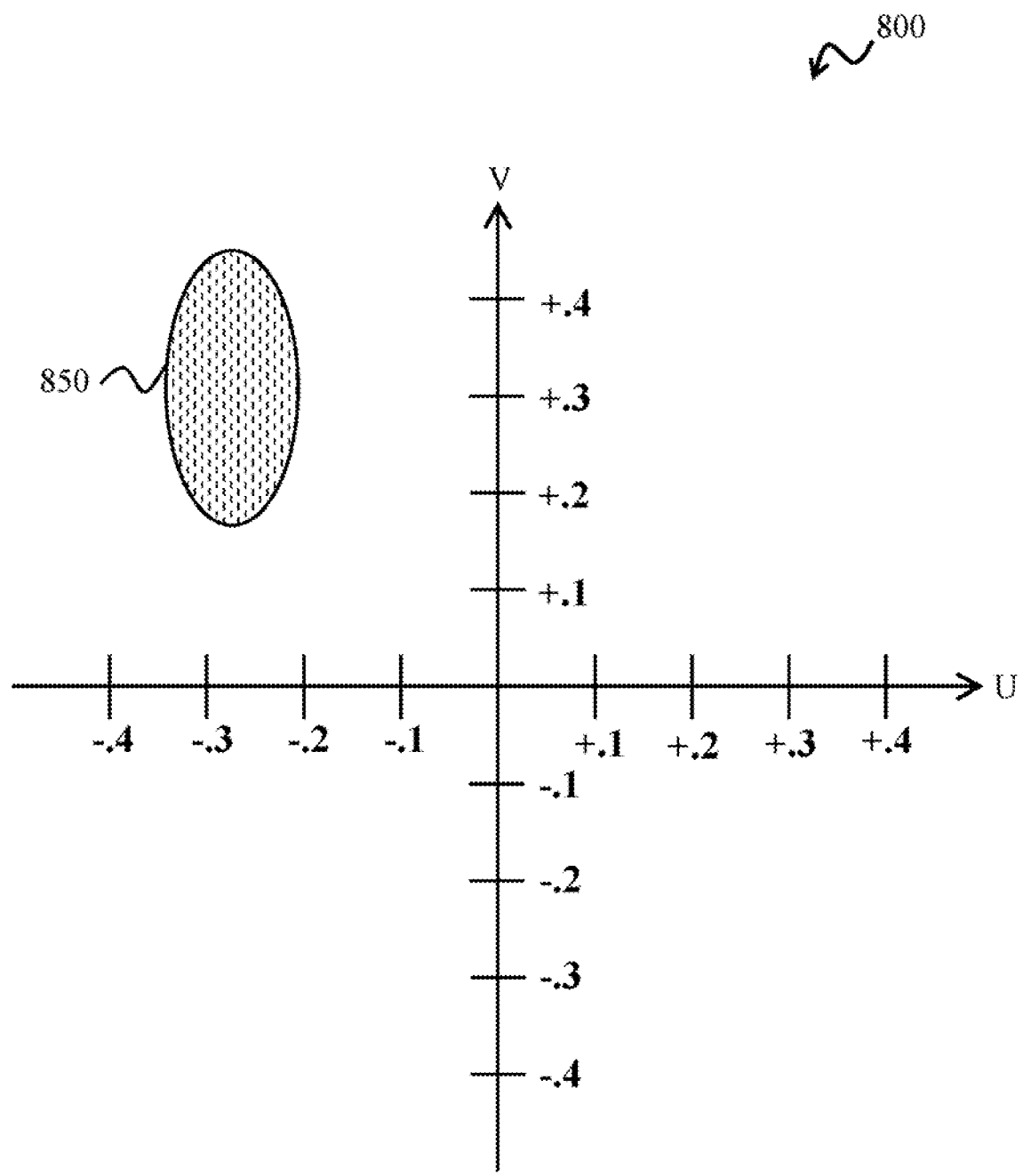
FIG. 13 is a schematic diagram of a second weight area according to some embodiments of this solution.

FIG. 10 is a schematic diagram of a weight area according to some embodiments of this solution. FIG. 1I is a local enlarged schematic diagram of a weight area according to some embodiments of this solution. FIG. 12 is a schematic diagram of a first weight area according to some embodiments of this solution, and FIG. 13 is a schematic diagram of a second weight area according to some embodiments of this solution. Referring to FIG. 3, FIG. 4, and FIG. 10 to FIG. 13, in step S160, in some embodiments, the skin color gamut weight map obtaining circuit 500 obtains a first weight area 840 and a second weight area 850 according to the first gamut 810 and the second gamut 820. Specifically, according to some embodiments, the first weight area 840 is a difference set of the first gamut 810 and the second gamut 820. The second weight area 850 is an intersection set of the first gamut 810 and the second gamut 820. Therefore, when the first gamut 810 covers the second gamut 820, the first weight area 840 in FIG. 12 is an area obtained after the second gamut 820 is subtracted from the first gamut 810 in FIG. 3, and the second weight area 850 in FIG. 13 is equal to the second gamut 820 in FIG. 3.

Continue to refer to FIG. 3, FIG. 4, and FIG. 10 to FIG. 13. In step S170, in some embodiments, the skin color gamut weight map obtaining circuit 500 is configured to obtain a skin color gamut weight map corresponding to the skin color region 740 according to the weight center 830, the first weight area 840, and the second weight area 850. Specifically, according to some embodiments, the skin color gamut weight map includes color components related to a skin color and weight values represented by the color components. The skin color gamut weight map obtaining circuit 500 obtains a plurality of first weight color blocks 870 from the first weight area 840, and obtains a plurality of second weight color blocks 880 from the second weight area 850. The first weight color blocks 870 and the second weight color blocks 880 are the color components related to the skin color in the skin color gamut weight map. The skin color gamut weight map obtaining circuit 500 further obtains weight values of the first weight color blocks 870 and the second weight color blocks 880 by using distances between the weight center 830 and each of the first weight color blocks 870 and distances between the weight center 830 and each of the second weight color blocks 880. Therefore, the skin color gamut weight map obtaining circuit 500 can obtain the skin color gamut weight map corresponding to the skin color region 740.

Figure 14:
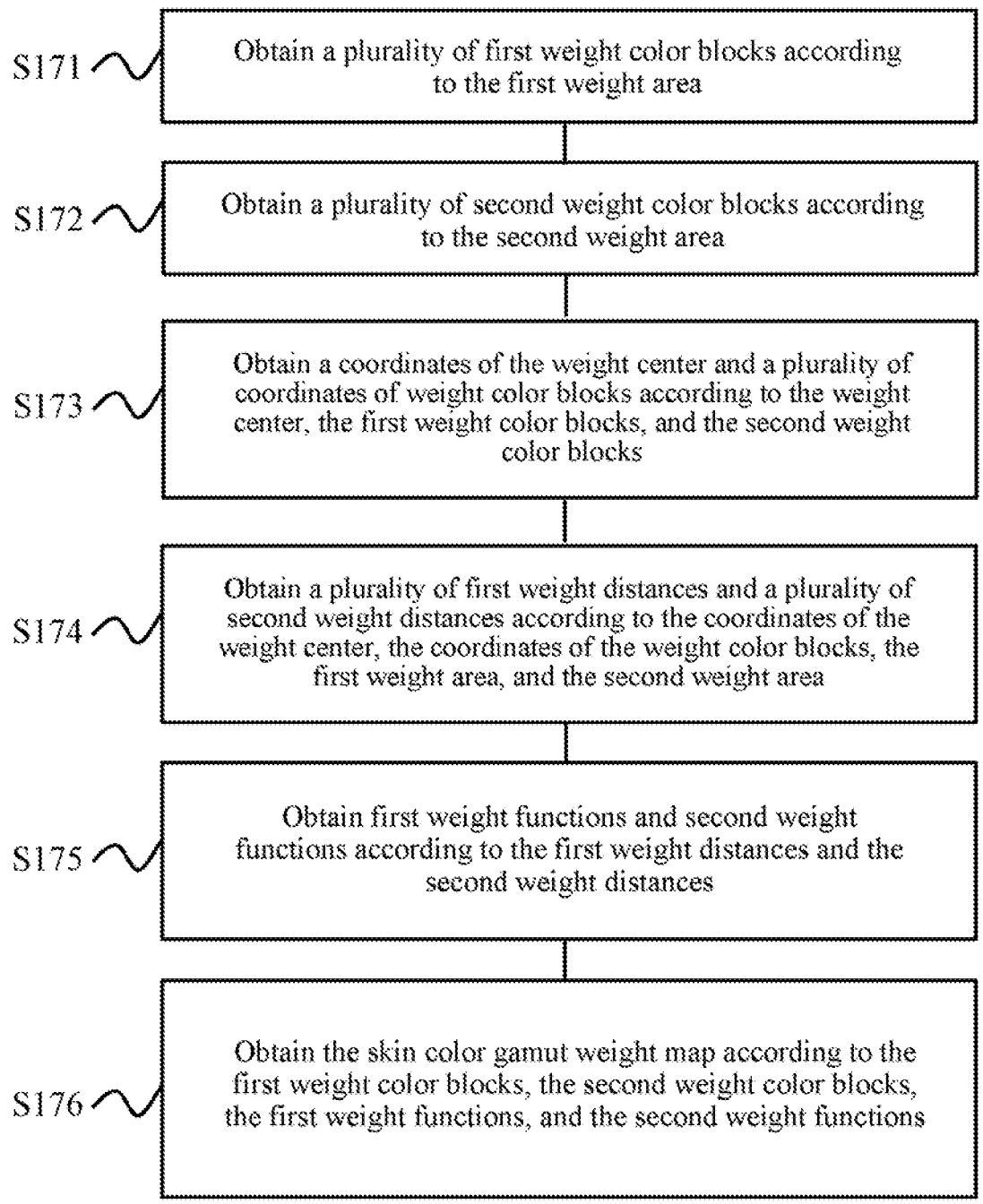
FIG. 14 is a flowchart of a skin color gamut weight map obtaining program according to some embodiments of this solution.
Figure 15:
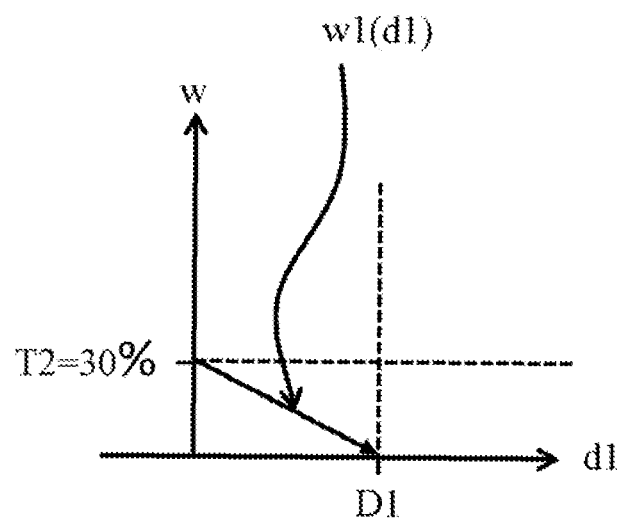
FIG. 15 is a diagram of relationships between first weight distances and first weight functions according to some embodiments of this solution.
Figure 16:
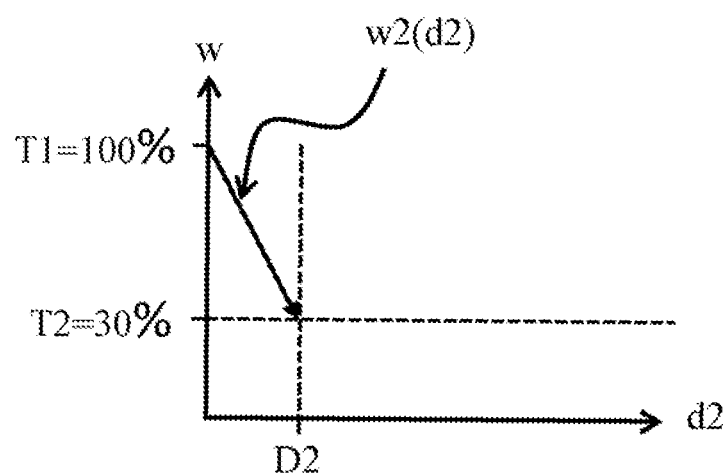
FIG. 16 is a diagram of relationships between second weight distances and second weight functions according to some embodiments of this solution.

FIG. 14 is a flowchart of a skin color gamut weight map obtaining program according to some embodiments of this solution. FIG. 15 is a diagram of relationships between first weight distances d1 and first weight functions w1(d1) according to some embodiments of this solution, and FIG. 16 is a diagram of relationships between second weight distances d2 and second weight functions w2(d2) according to some embodiments of this solution. Referring to FIG. 11 and FIG. 14 to FIG. 16, in some embodiments, the skin color gamut weight map obtaining program is configured to obtain the skin color gamut weight map, where the skin color gamut weight map obtaining program includes the following steps: obtaining a plurality of first weight color blocks 870 according to the first weight area 840 (step S171); obtaining a plurality of second weight color blocks 880 according to the second weight area 850 (step S172); obtaining coordinates of the weight center and a plurality of coordinates of weight color blocks according to the weight center 830, the first weight color blocks 870, and the second weight color blocks 880 (step S173); obtaining a plurality of first weight distances d1 and a plurality of second weight distances d2 according to the coordinates of the weight center, the coordinates of the weight color blocks, the first weight area 840, and the second weight area 850 (step S174); obtaining first weight functions w1(d1) and second weight functions w2(d2) according to the first weight distances d1 and the second weight distances d2 (step S175); and obtaining the skin color gamut weight map according to the first weight color blocks 870, the second weight color blocks 880, the first weight functions w1(d1), and the second weight functions w2(d2) (step S176).

Figure 11:
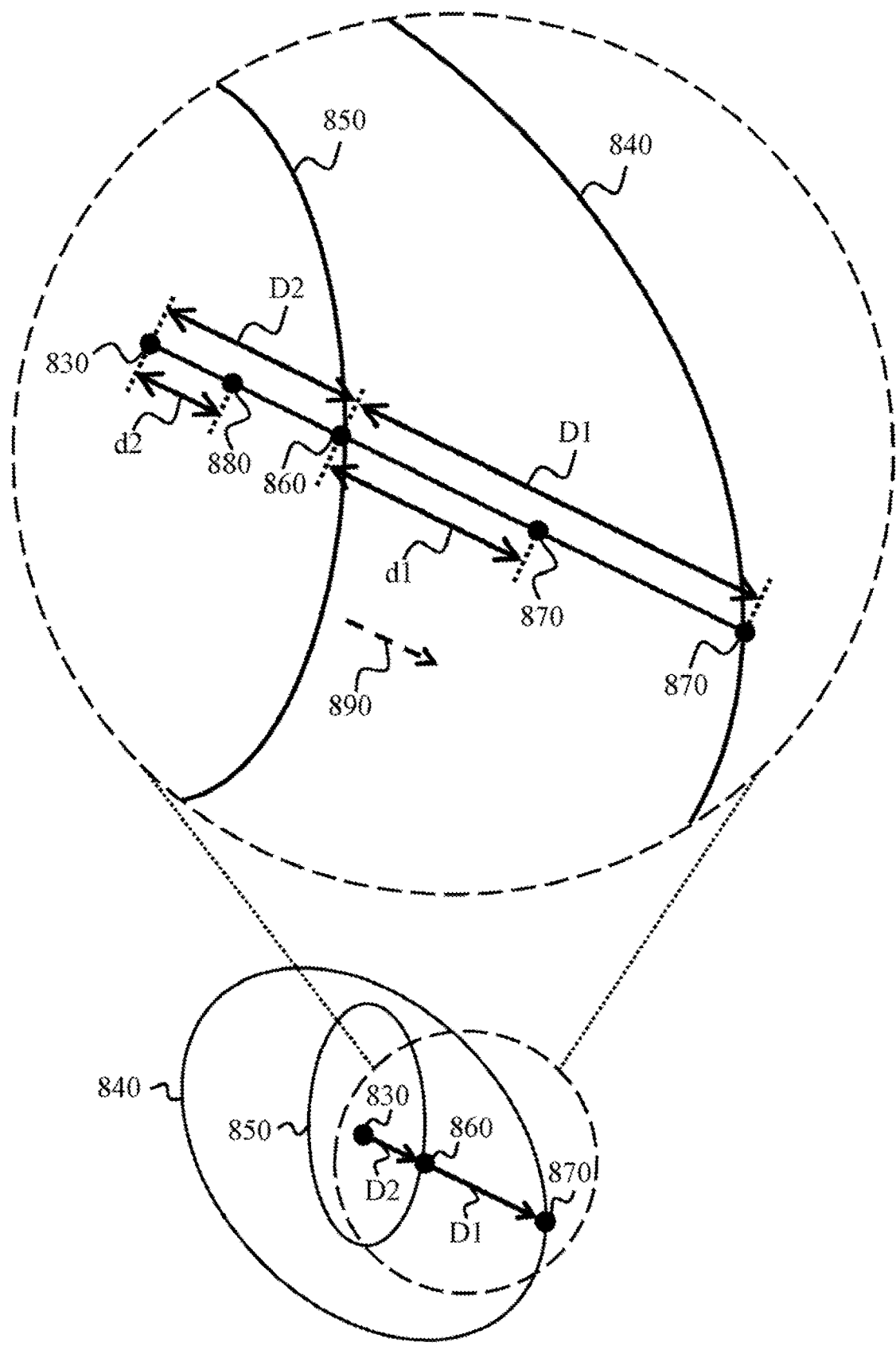
FIG. 11 is a local enlarged schematic diagram of a weight area according to some embodiments of this solution.

Referring to FIG. 11 and FIG. 14, in step S171 and step S172, in some embodiments, the skin color gamut weight map obtaining circuit 500 obtains a plurality of first weight color blocks 870 according to the first weight area 840, and the skin color gamut weight map obtaining circuit 500 obtains a plurality of second weight color blocks 880 according to the second weight area 850. Specifically, the skin color gamut weight map obtaining circuit 500 segments the first weight area 840 and the second weight area 850 into unit color blocks, where unit color blocks in the first weight area 840 are the first weight color blocks 870, and unit color blocks in the second weight area 850 are the second weight color blocks 880. According to some embodiments, a unit length and a unit width of a unit color block in the UV color plane 800 is $1/128$, so that the UV color plane 800 has 128*128 unit color blocks.

Referring to FIG. 11 and FIG. 14, in step S173, in some embodiments, the skin color gamut weight map obtaining circuit 500 obtains coordinates of the weight center and a plurality of coordinates of weight color blocks according to the weight center 830, the first weight color blocks 870, and the second weight color blocks 880. Specifically, the coordinates of the weight center are coordinates of the weight center 830 with a center point is in the UV color plane 800. Therefore, the skin color gamut weight map obtaining circuit 500 can obtain the coordinates of the weight center by using the normalized first color component values corresponding to the first maximum value M1 and the normalized second color component values corresponding to the second maximum value M2. The coordinates of the weight color blocks are coordinates of center points of the first weight color blocks 870 and the second weight color blocks 880 in the UV color plane 800. Therefore, the skin color gamut weight map obtaining circuit 500 can obtain coordinates of weight color blocks when respectively segmenting the first weight color blocks 870 and the second weight color blocks 880 from the first weight area 840 and the second weight area 850.

Referring to FIG. 11 and FIG. 14, in step S74, in some embodiments, the skin color gamut weight map obtaining circuit 500 obtains a plurality of first weight distances d1 and a plurality of second weight distances d2 according to the coordinates of the weight center, the coordinates of the weight color blocks, the first weight area 840, and the second weight area 850. Specifically, according to some embodiments, if the first weight area 840 and the second weight area 850 are located in the first weight area 840 and the second weight area 850, because the first weight area 840 is on the periphery of the second weight area 850, a line between one of the first weight color blocks 870 and the weight center 830 intersects at a point in the boundary between the first weight area 840 and the second weight area 850, and the point is referred to as a weight boundary point 860 below. Assuming that weight color block coordinates of the first weight color blocks 870 are ($U_1$, $V_1$), weight color block coordinates of the second weight color blocks 880 are ($U_2$, $V_2$), the coordinates of the weight center are ($U_C$, $V_C$), and coordinates of the weight boundary point 860 are ($U_B$, $V_B$), the first weight distance d1 is equal to a distance between the weight color block coordinates ($U_1$, $V_1$) and the coordinates ($U_B$, $V_B$) of the weight boundary point 860, and the second weight distance d2 is equal to a distance between the weight color block coordinates ($U_2$, $V_2$) and the coordinates ($U_C$, $V_C$) of the weight center 830. The formula is as follows.

$$d1 = \sqrt{(U_1-U_B)^2+(V_1-V_B)^2}$$

$$d2 = \sqrt{(U_2-U_C)^2+(V_2-V_C)^2}$$

Referring to FIG. 11, FIG. 15, and FIG. 16, in step S175, in some embodiments, the skin color gamut weight map obtaining circuit 500 obtains first weight functions w1(d1) and second weight functions w2(d2) according to the first weight distances d1 and the second weight distances d2. Specifically, in some embodiments, a Y-axis represents a weight coefficient w in FIG. 15 and FIG. 16, an X-axis in FIG. 15 represents the first weight distance d1, and an X-axis in FIG. 16 represents the second weight distance d2. Assuming that a weight direction 890 of the first weight color blocks 870 is from the weight boundary point 860 toward the first weight color blocks 870, a weight direction 890 of the second weight color blocks 880 is from the weight center 830 toward the second weight color blocks 880, and the first weight functions w1(d1) and the second weight functions w2(d2) are linear functions, the first weight function w1(d1) and the second weight function w2(d2) are as follows:

$$w1(d1) = -T2 * \frac{d1}{D1} + T2$$

$$w2(d2) = -(T1-T2)\frac{d2}{D2} + T1$$

T1 is a first weight percentage, T2 is a second weight percentage, and the first weight percentage T1 and the second weight percentage T2 are constant values. D1 is a maximum value in the first weight distances d1 corresponding to the first weight color blocks 870 in the weight direction 890 corresponding to the first weight color blocks 870. D2 is a maximum value in the second weight distances d2 corresponding to the second weight color blocks 880 in the weight direction 890 corresponding to the second weight color blocks 880.

Referring to FIG. 15, in some embodiments, the second weight percentage T2 is 30%. The first weight function w1(d1) of the first weight color blocks 870 in the first weight distance d1=0 (namely, the weight boundary point 860) is the first weight function w1(d1)=30%. The first weight function w1(d1) of the first weight color blocks 870 in the first weight distance d1=D1 (namely, the first weight color blocks 870 on the periphery of the first weight area 840) is the first weight function w1(d1)=0. Therefore the first weight function w1(d1) is as follows.

$$w1(d1) = -30% * \frac{d1}{D1} + 30%$$

Referring to FIG. 16, in some embodiments, the first weight percentage T1 is 100%, and the second weight percentage T2 is 30%. The second weight function w2(d2) of the second weight color blocks 880 in the second weight distance d2=0 (namely, the weight center 830) is the second weight functions w2(d2)=100%. The second weight function w2(d2) of the second weight color blocks 880 in the second weight distance d2=D2 (namely, the weight boundary point 860) is the second weight functions w2(d2)=30%. Therefore the second weight function w2(d2) is as follows.

$$w2(d2) = -70% \frac{d2}{D2} + 100%$$

It should be particularly noted that the first weight percentages T1 and the second weight percentages T2 above are only used as examples. This solution is not limited thereto.

Continue to refer to FIG. 11, FIG. 15, and FIG. 16. In step S176, in some embodiments, the skin color gamut weight map obtaining circuit 500 obtains the skin color gamut weight map according to the first weight color blocks 870, the second weight color blocks 880, the first weight functions w1(d1), and the second weight functions w2(d2). Specifically, because the skin color gamut weight map includes color components related to the skin color of the character image 720 and weight values corresponding to the color components, the first weight color blocks 870 and the second weight color blocks 880 obtained by the skin color gamut weight map obtaining circuit 500 are the color components related to the skin color of the character image 720. The skin color gamut weight map obtaining circuit 500 can obtain the weight coefficients w corresponding to the first weight color blocks 870 and the second weight color blocks 880 by using the first weight functions w1(d1) and the second weight functions w2(d2). Therefore, the skin color gamut weight map obtaining circuit 500 obtains the skin color gamut weight map.

In conclusion, the skin color image gamut weight detecting method and the device thereof provided in some embodiments of this solution can obtain the skin color gamut weight map of the skin color region of the character image according to the image having the character image. The skin color gamut weight map includes a skin color gamut in the character image and weight values corresponding to color blocks in the skin color gamut. In some embodiments, users can further separately adjust the skin color of the character image of the image by using the skin color gamut weight map without affecting other parts of the image, to meet user requirements.

What is claimed is:

1. A skin color image gamut weight detecting method, comprising:
receiving an image, the image having a character image, the image comprising a plurality of pixels, and each of the pixels comprising:

a first color component; and
a second color component;
obtaining a skin color region of the character image, a skin color category corresponding to the skin color region, and a first gamut corresponding to the skin color category according to a skin color determining program;
obtaining a plurality of first color component values and a plurality of first cardinal numbers according to the first color components in the skin color region;
obtaining a plurality of second color component values and a plurality of second cardinal numbers according to the second color components in the skin color region;
obtaining a second gamut and a weight center according to the skin color category, the first cardinal numbers, the first color component values, the second cardinal numbers, and the second color component values;
obtaining a first weight area and a second weight area according to the first gamut and the second gamut; and
obtaining a skin color gamut weight map corresponding to the skin color region according to the weight center, the first weight area, and the second weight area.

2. The skin color image gamut weight detecting method according to claim 1, further comprising a gamut obtaining program for obtaining the second gamut and the weight center, the gamut obtaining program comprising:
obtaining the weight center according to the first color component value corresponding to a first maximum value in the first cardinal numbers and the second color component value corresponding to a second maximum value in the second cardinal numbers;
obtaining a first threshold according to the first maximum value in the first cardinal numbers and a first coefficient;
obtaining a second threshold according to the second maximum value in the second cardinal numbers and a second coefficient;
setting the first cardinal numbers greater than or equal to the first threshold as a plurality of first selected cardinal numbers;
setting the second cardinal numbers greater than or equal to the second threshold as a plurality of second selected cardinal numbers; and
obtaining the second gamut according to the first selected cardinal numbers, the first color component values, the second selected cardinal numbers, and the second color component values.

3. The skin color image gamut weight detecting method according to claim 1, further comprising a gamut obtaining program for obtaining the second gamut and the weight center, the gamut obtaining program comprising:
obtaining a plurality of first calibration cardinal numbers, a plurality of first calibration color component values, a plurality of second calibration cardinal numbers, and a plurality of second calibration color component values according to the skin color category, the first cardinal numbers, the first color component values, the second cardinal numbers, and the second color component values;
obtaining the weight center according to the first calibration color component value corresponding to a first maximum value in the first calibration cardinal numbers and the second calibration color component value corresponding to a second maximum value in the second calibration cardinal numbers;
obtaining a first threshold according to the first maximum value in the first calibration cardinal numbers and a first coefficient;
obtaining a second threshold according to the second maximum value in the second calibration cardinal numbers and a second coefficient;
setting the first calibration cardinal numbers greater than or equal to the first threshold as a plurality of first selected cardinal numbers;
setting the second calibration cardinal numbers greater than or equal to the second threshold as a plurality of second selected cardinal numbers; and
obtaining the second gamut according to the first selected cardinal numbers, the first calibration color component values, the second selected cardinal numbers, and the second calibration color component values.

4. The skin color image gamut weight detecting method according to claim 1, further comprising a skin color gamut weight map obtaining program for obtaining the skin color gamut weight map, the skin color gamut weight map obtaining program comprising:
obtaining a plurality of first weight color blocks according to the first weight area;
obtaining a plurality of second weight color blocks according to the second weight area;
obtaining coordinates of the weight center and a plurality of coordinates of weight color blocks according to the weight center, the first weight color blocks, and the second weight color blocks;
obtaining a plurality of first weight distances and a plurality of second weight distances according to the coordinates of the weight center, the coordinates of the weight color blocks, the first weight area, and the second weight area;
obtaining a plurality of first weight functions and a plurality of second weight functions according to the first weight distances and the second weight distances; and
obtaining the skin color gamut weight map according to the first weight color blocks, the second weight color blocks, the first weight functions, and the second weight functions.

5. The skin color image gamut weight detecting method according to claim 1, wherein the skin color determining program comprises:
determining that there is the character image in the image;
obtaining the skin color region of the character image and a plurality of coordinates of the skin color region according to the image;
obtaining the skin color category and a confidence coefficient corresponding to the skin color category according to the pixels in the skin color region; and
obtaining the first gamut according to the skin color category.

6. A skin color image gamut weight detecting device, comprising:
an image receiving circuit, configured to receive an image, the image having a character image, the image comprising a plurality of pixels, and each of the pixels comprising:
a first color component; and
a second color component;
a skin color determining circuit, configured to obtain a skin color region of the character image, a skin color category corresponding to the skin color region, and a first gamut corresponding to the skin color category according to a skin color determining program;

a skin color analyzing circuit, configured to obtain a plurality of first color component values and a plurality of first cardinal numbers according to the first color components in the skin color region, and configured to obtain a plurality of second color component values and a plurality of second cardinal numbers according to the second color components in the skin color region;

a gamut obtaining circuit, configured to obtain a second gamut and a weight center according to the skin color category, the first cardinal numbers, the first color component values, the second cardinal numbers, and the second color component values; and a skin color gamut weight map obtaining circuit, configured to obtain a first weight area and a second weight area according to the first gamut and the second gamut, and configured to obtain a skin color gamut weight map corresponding to the skin color region according to the weight center, the first weight area, and the second weight area.

7. The skin color image gamut weight detecting device according to claim 6, wherein the gamut obtaining circuit obtains the second gamut and the weight center according to a gamut obtaining program, and the gamut obtaining program comprises:

obtaining a first threshold according to the maximum value in the first cardinal numbers and a first coefficient;

obtaining a second threshold according to the maximum value in the second cardinal numbers and a second coefficient;

setting the first cardinal numbers greater than or equal to the first threshold as a plurality of first selected cardinal numbers;

setting the second cardinal numbers greater than or equal to the second threshold as a plurality of second selected cardinal numbers; and obtaining the second gamut according to the first selected cardinal numbers, the first color component values, the second selected cardinal numbers, and the second color component values.

8. The skin color image gamut weight detecting device according to claim 6, wherein the gamut obtaining circuit obtains the second gamut and the weight center according to a gamut obtaining program, and the gamut obtaining program comprises:

obtaining a plurality of first calibration cardinal numbers, a plurality of first calibration color component values, a plurality of second calibration cardinal numbers, and a plurality of second calibration color component values according to the skin color category, the first cardinal numbers, the first color component values, the second cardinal numbers, and the second color component values;

obtaining a first threshold according to the maximum value in the first calibration cardinal numbers and a first coefficient;

obtaining a second threshold according to the maximum value in the second calibration cardinal numbers and a second coefficient;

setting the first calibration cardinal numbers greater than or equal to the first threshold as a plurality of first selected cardinal numbers;

setting the second calibration cardinal numbers greater than or equal to the second threshold as a plurality of second selected cardinal numbers; and obtaining the second gamut according to the first selected cardinal numbers, the first calibration color component values, the second selected cardinal numbers, and the second calibration color component values.

9. The skin color image gamut weight detecting device according to claim 6, wherein the skin color gamut weight map obtaining circuit obtains the skin color gamut weight map according to a skin color gamut weight map obtaining program, and the skin color gamut weight map obtaining program comprises:

obtaining a plurality of first weight color blocks according to the first weight area;

obtaining a plurality of second weight color blocks according to the second weight area;

obtaining coordinates of the weight center and a plurality of coordinates of weight color blocks according to the weight center, the first weight color blocks, and the second weight color blocks;

obtaining a plurality of first weight distances and a plurality of second weight distances according to the coordinates of the weight center, the coordinates of the weight color blocks, the first weight area, and the second weight area;

obtaining a first weight function and a second weight function according to the first weight distances and the second weight distances; and obtaining the skin color gamut weight map according to the first weight color blocks, the second weight color blocks, the first weight function, and the second weight function.

10. The skin color image gamut weight detecting device according to claim 6, wherein the skin color determining program comprises:

determining that there is the character image in the image;

obtaining the skin color region of the character image and a plurality of coordinates of the skin color region according to the image;

obtaining the skin color category and a confidence coefficient corresponding to the skin color category according to the pixels in the skin color region; and obtaining the first gamut according to the skin color category.

* * * * *